United States Patent
Makino (10) Patent No.: US 8,016,423 B2
(45) Date of Patent: Sep. 13, 2011

(54) PROJECTION DEVICE FOR IMAGE PROJECTION WITH DOCUMENT CAMERA DEVICE CONNECTED THERETO, PROJECTION METHOD, AND STORAGE MEDIUM

(75) Inventor: Tomoya Makino, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 373 days.

(21) Appl. No.: 12/268,497

(22) Filed: Nov. 11, 2008

(65) Prior Publication Data

US 2009/0128715 A1    May 21, 2009

(30) Foreign Application Priority Data

Nov. 19, 2007    (JP) ................. 2007-299720

(51) Int. Cl.
*G03B 21/26* (2006.01)
(52) U.S. Cl. ............... 353/30; 353/36; 353/122
(58) Field of Classification Search ............. 353/30, 353/122, 36; 382/305, 306; 348/333.05
See application file for complete search history.

(56) References Cited

U.S. PATENT DOCUMENTS

| | | | |
|---|---|---|---|
| 6,091,377 A | | 7/2000 | Kawai |
| 6,829,430 B1 * | | 12/2004 | Ashizaki et al. ............. 386/117 |
| 7,173,628 B1 | | 2/2007 | Kawai |
| 2001/0030668 A1 * | | 10/2001 | Erten et al. ................. 345/863 |
| 2002/0083463 A1 * | | 6/2002 | Camara ......................... 725/110 |

FOREIGN PATENT DOCUMENTS

| | | |
|---|---|---|
| JP | 8-251521 A | 9/1996 |
| JP | 2000-010189 A | 1/2000 |
| JP | 2007-097043 A | 4/2007 |
| JP | 2007-274446 A | 10/2007 |

OTHER PUBLICATIONS

Japanese Office Action dated Oct. 27, 2009 and English translation thereof issued in a counterpart Japanese Application No. 2007-299720.

* cited by examiner

*Primary Examiner* — Thanh X Luu
(74) *Attorney, Agent, or Firm* — Holtz, Holtz, Goodman & Chick, PC (57) ABSTRACT

A projection device comprises an input section for inputting an image signal, a storage section for storing the image signal input by the input section after adding identification information thereto, a projection section for forming and projecting an optical image corresponding to the image signal, and a projection control section for using an image signal currently input by the input section and the image signal already stored in the storage section to cause the projection section to project, as one image, a plurality of screens together with indications based on the identification information for the respective screens.

7 Claims, 6 Drawing Sheets

PROJECTION DEVICE FOR IMAGE PROJECTION WITH DOCUMENT CAMERA DEVICE CONNECTED THERETO, PROJECTION METHOD, AND STORAGE MEDIUM

CROSS-REFERENCE TO RELATED APPLICATIONS

This application is based upon and claims the benefit of priority from prior Japanese Patent Application No. 2007-299720, filed Nov. 19, 2007, the entire contents of which are incorporated herein by reference.

BACKGROUND OF THE INVENTION

1. Field of the Invention

The present invention relates to a projection device suitable for projecting images of various documents with, for example, a document camera device connected thereto, a projection method, and a storage medium.

2. Description of the Related Art

For example, Jpn. Pat. Appln. KOKAI Publication No. 2000-010189 (Patent document 1) has devised a technique for providing a data projector with a document camera which shows a picture supplied from an external information device such as a personal computer, and, at the same time, also shows a picture taken by the document camera, thereby enabling multiple screens to be displayed in one screen.

However, in some techniques, including the one described in Patent document 1, identification of the respective screens becomes unclear when multiscreen display is performed especially with a large number of screens; for example, it is unclear in which order the screens are projected or which screen shows the current photograph of the document camera.

The present invention has been made in view of such circumstances, and is directed to provide a projection device, a projection method and a storage medium which enable clear identification of screens in multiscreen display in which a plurality of screens are arranged in one screen.

BRIEF SUMMARY OF THE INVENTION

According to one preferred aspect of this invention, there is provided a projection device comprising: input means for inputting an image signal; storage means for storing the image signal input by the input means after adding identification information thereto; projection means for forming and projecting an optical image corresponding to the image signal; and projection control means for using an image signal currently input by the input means and the image signal already stored in the storage means to cause the projection means to project, as one image, a plurality of screens together with indications based on the identification information for the respective screens.

According to another preferred aspect of this invention, there is provided a method of projection in a device having a projection section which forms and projects an optical image corresponding to an image signal, the method comprising: a storage step of storing the input image signal in a memory after adding identification information thereto; and a projection control step of using a currently input image signal and the image signal already stored in the memory to cause the projection section to project, as one image, a plurality of screens together with indications based on the identification information for the respective screens.

According to another preferred aspect of this invention, there is provided a storage medium storing a program readable by a computer built in a device having a projection section which forms and projects an optical image corresponding to an image signal, the program causing the computer to execute: a storage step of storing the input image signal in a memory after adding identification information thereto; and a projection control step of using a currently input image signal and the image signal already stored in the memory to cause the projection section to project, as one image, a plurality of screens together with indications based on the identification information for the respective screens.

DETAILED DESCRIPTION OF THE INVENTION

One embodiment will hereinafter be described with reference to the drawings wherein the present invention is applied to a data projector device of a digital light processing (DLP) (registered trademark) type connected to a document camera device.

Figure 1:
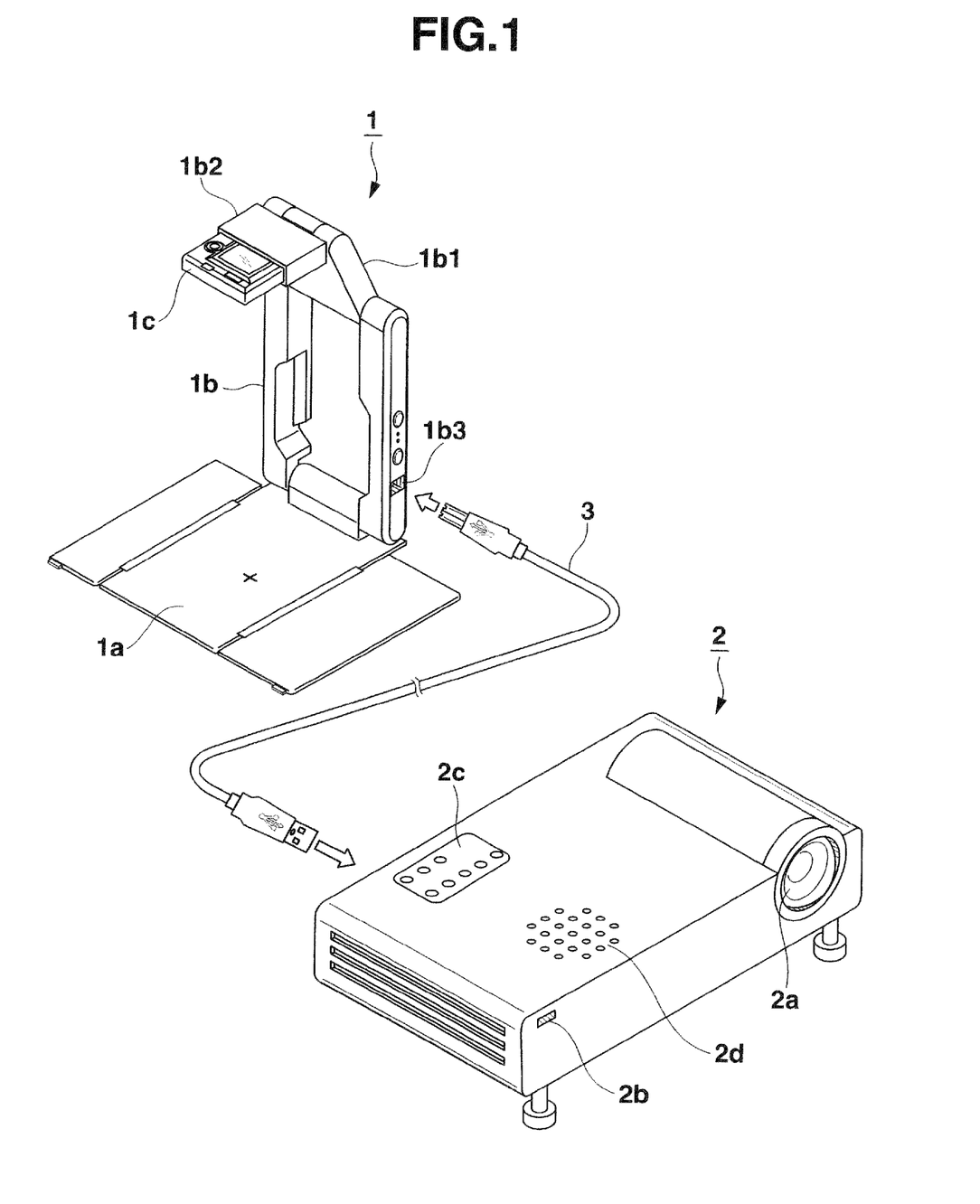
FIG. 1 is an external view showing how a document camera device and a data projector device according to one embodiment of the present invention are connected together through a USB cable.

FIG. 1 shows how a document camera device 1 and a data projector device 2 are connected together through a universal serial bus (USB) cable 3.

The document camera device 1 comprises a combination of a document table 1a, a stand unit 1b and a camera unit 1c.

The document table 1a is composed of, for example, three folding thin-plate-shaped members (synthetic resin plates) connected via hinges, and the stand unit 1b stands up from the edge of the central synthetic resin plate. A camera attachment portion 1b2 is attached to the top of the stand unit 1b via a pivot arm 1b1, and this camera attachment portion 1b2 is pivotally disposed in parallel with the document table 1a.

Furthermore, the camera unit 1c is attached to the camera attachment portion 1b2, so that images of various documents mounted on the document table 1a may be taken.

In addition, a USB connector 1b3 for attaching the USB cable 3 is provided on a lateral side of the stand unit 1b. In the document camera device 1, an image of document paper mounted on the document table 1a is taken by the camera unit 1c, and its image signal is output to an externally connected device (the data projector device 2 in the present embodiment) via the USB cable 3.

In the data projector device 2 connected to the document camera device 1 via the USB cable 3, an optical image based on the image signal from the document camera device 1 is formed, and the optical image is projected from a projection lens unit 3a to a screen which is not shown here. In the data projector device 2, the projection lens unit 3a and a remote controller light receiving unit 2b are provided in the front surface of a substantially rectangular case, and a key operation unit 2c and a speaker unit 2d are provided in the top surface.

Figure 2:
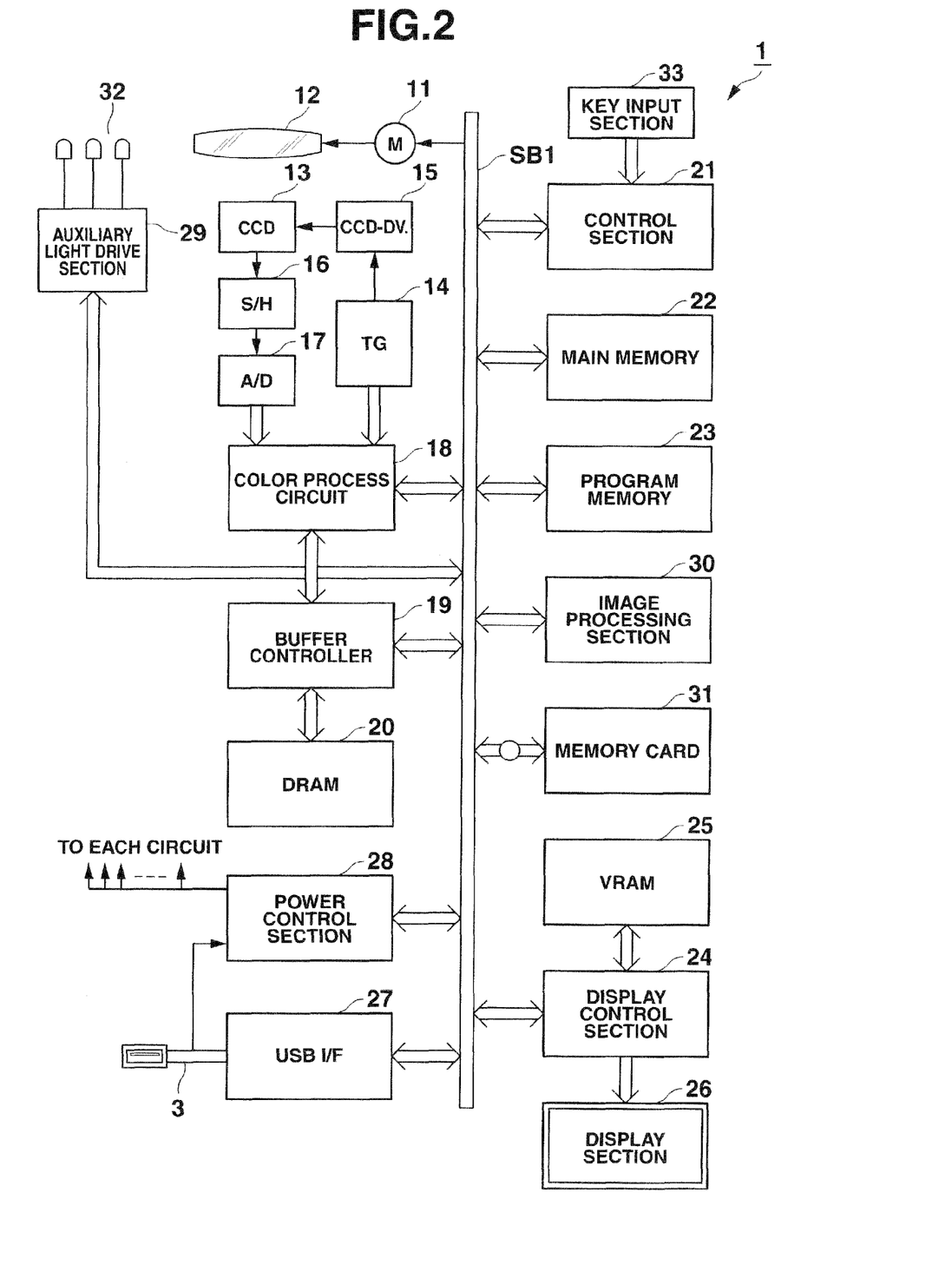
FIG. 2 is a block diagram showing the conceptual configurations of electronic circuits of the document camera according to the embodiment.

Next, the schematic functional configuration of the document camera device 1 is described with FIG. 2.

FIG. 2 shows the conceptual configurations of electronic circuits of the whole document camera 1 according to the embodiment.

In FIG. 2, a motor (M) 11 is driven, such that the positions of some of the lenses in a photographic lens optical system 12 attached to the lower side of the camera unit 1c, more specifically, a zoom lens and a focus lens are properly moved. A charge coupled device (CCD) 13, which is a solid-state image sensing device, is disposed at an image focus position in the rear of the photographic optical axis of the photographic lens optical system 12 via an unshown mechanical shutter.

The CCD 13 is driven for scanning by a timing generator (TG) 14 and a CCD driver (Dv.) 15, and outputs, for one screen, photoelectrically converted outputs corresponding to optical images formed at regular periods.

In a sample hold (S/H) circuit 16, this photoelectrically converted output is subjected to sample holding and then automatic gain control (AGC) in an analog value state in accordance with an TSO film speed currently set for each of primary color components RGB, and then sent to an A/D converter 17.

The A/D converter 17 converts the analog image data to digital data, and outputs the digital data to a color process circuit 18.

The color process circuit 18 subjects the digital image data to color processes, including a pixel interpolation process and a y correction process, and generates digital-value image data YUV of a luminance/color difference system by matrix conversion, and then outputs the image data YUV to a buffer controller 19.

The buffer controller 19 once writes the image data YUV output by the color process circuit 18 in a buffer controller 29 using a composite synchronization signal, a memory write enable signal and a clock signal also derived from the color process circuit 18, and then DMA-transfers the image data YUV to a DRAM 20 used as a buffer memory.

This DRAM 20 has a region for retaining the image data obtained by the above-mentioned photography.

A control section 21 is configured by a CPU, and is connected to, via a system bus SB1, a main memory 22 used as a work memory, and to a program memory 23 configured by a nonvolatile memory which fixedly stores an operation program, data, etc. The control section 21 reads a necessary program, fixed data, etc. from the program memory 23, and temporarily expands and writes the necessary program and data properly in the data projector device 2, and at the same time controls the operation of the whole document camera device 1.

Thus, after having finished the DMA transfer of the image data to the DRAM 20, the control section 21 reads this image data from the DRAM 20 via the buffer controller 19, and writes the image data in a VRAM 25 via a display control section 24.

The display control section 24 regularly reads the image data from the VRAM 25, and outputs the image data to a display section 26.

This display section 26 is composed of a color liquid crystal panel with a backlight, and its drive circuit. The display section 26 is disposed on the upper side of the camera unit 1c, and functions as a viewfinder which enables the contents of photography to be visually recognized even when the document camera device 1 is not connected to an external device. The display section 26 performs display based on, for example, the image data from the display control section 24, and thereby monitor-displays images loaded from the CCD 13 in real time.

On the other hand, the control section 21 causes the image data retained in the DRAM 20 to be read by the buffer controller 19, and outputs the image data to a USB interface (I/F) 27. The USB interface 27 transmits/receives various kinds of data, including image data, to/from an external device in compliance with USB 2.0 standard, and outputs the image data to the external device via the USB cable 3 by isochronous transfer.

In addition, the USB cable 3 doubles as a power cable, so that a power line defined by the USB standard is connected to a power control section 28. The power control section 28 generates various voltages, such as a power of 1.5[V] or 3.3[V] from a D.C. power of 5.0[V] supplied from the USB cable 3, and applies necessary operating voltages to other circuits.

Furthermore, an auxiliary light drive section 29, an image processing section 30 and a memory card 31 are also connected to the system bus SB1.

The auxiliary light drive section 29 simultaneously lights and drives a plurality of high-luminance white LEDs 32 under the control of the control section 21, and illuminates the document paper mounted on the document table 1a.

The image processing section 30 not only performs various kinds of image processing but also compresses the image data retained in the DPAM 20 in compliance with a predetermined standard, such as Joint Photographic Experts Group (JPEG), under the control of the control section 21.

The memory card 31 is removably attached to the camera unit 1c of the document camera device 1, and records the data image compressed by the image processing section 30, etc.

In addition, a key input section 33 is constituted by various key switches provided in the camera unit 1c and the stand unit 1b of the document camera device 1, and a key operation signal in this key input section 33 is directly sent to the control section 21. The control section 21 performs operational control corresponding to this key operation signal from the key input section 33.

Figure 3:
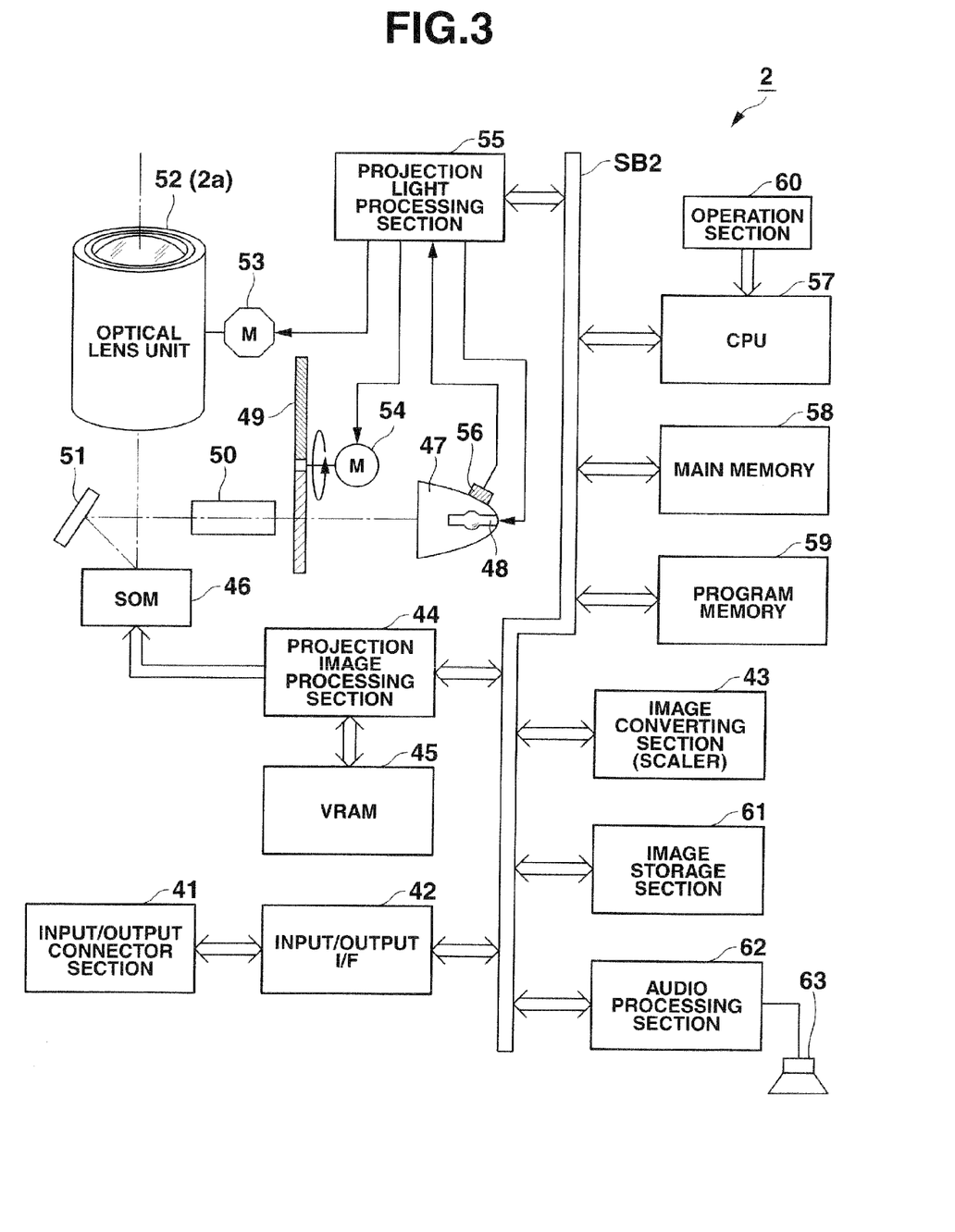
FIG. 3 is a block diagram showing the conceptual configurations of electronic circuits of the data projector device according to the embodiment.

Next, the functional configurations of electronic circuits provided in the data projector device 2 are described with FIG. 3.

In FIG. 3, 41 denotes an input/output connector section provided on the rear side of the main body casing of the data projector device 2. The input/output connector section 41 is composed of a pin jack (RCA) type video input terminal, an RGB input terminal and a USB terminal.

The image signals of various standards input by the input/output connector section 41 are unified into image signals in a predetermined format including the number of gradations, etc. by an image converting section 43, also generally known as a scaler, via an input/output interface (I/F) 42 and a system bus SB2, and the image signals are then sent to a projection image processing section 44.

At this moment, various images and symbols such as a pointer for on-screen display (OSD) are also sent to the projection image processing section 44 in a state superposed on the image signal, as needed.

The projection image processing section 44 expands and stores the sent image signal in a VRAM 45, and then generates a video signal from the contents stored in this VRAM 45.

The projection image processing section 44 drives the display of a spatial optical modulator (SOM) such as a micro mirror element 46 by faster time-division driving in which the number of divisions of color components and the number of display gradations are multiplied by the frame rate of the video signal, for example, 60 [frames/sec].

On the other hand, a light source lamp 48 using, for example, an ultra high pressure mercury lamp which is disposed in a reflector 47 emits high-luminance white light. The white light emitted by the light source lamp 48 is colored in primary colors in a time-division manner via a color wheel 49, and formed into a light flux with uniform luminance distribution by an integrator 50, and then totally reflected by a mirror 51 and applied to the micro mirror element 46.

Furthermore, an optical image is formed out of the reflected light in the micro mirror element 46, and the formed optical image is projected and displayed on a projection target screen, which is not shown here, via a projection lens unit 52 constituting the projection lens unit 2*a*.

As described above, the projection lens unit 52 enlarges the optical image formed in the micro mirror element 46 and projects it on a target such as the screen, and the focal position and zoom position (projection field angle) of the projection lens unit 52 can be freely varied.

That is, of a plurality of optical lenses constituting the projection lens unit 52, a focus lens and a zoom lens that are not shown are moved together back and forth in an optical axis direction and thereby controlled, and these lenses are moved by the turning/driving of a stepping motor (M) 53.

Furthermore, a motor (M) 54 for rotating the color wheel 49 is provided.

Thus, a projection light processing section 55 performs the driving of the light source lamp 48, the rotational drive of the motor 54 for rotating the color wheel 49 and the turning driving of the stepping motor 53 for the projection lens unit 52.

Moreover, temperature data from a temperature sensor 56 attached to the reflector 47 for detecting the temperature of the light source lamp 48 is input to the projection light processing section 55.

The operations of all the circuits described above are controlled by a CPU 57. This CPU 57 performs operational control of the data projector device 2 using a main memory 58 configured by a synchronous DRAM (SDRAM) and a program memory 59 configured by an electrically rewritable nonvolatile memory storing an operation program, various kinds of data in fixed forms, etc.

The CPU 57 performs various kinds of projection operations in accordance with an operation signal from an operation section 60. This operation section 60 includes a key operation part, and an infrared ray receiving part for receiving an infrared modulation signal from an unshown remote controller exclusive to the data projector device 2. A key code signal based on the keys operated by a user directly or via the remote controller is directly output to the CPU 57.

The CPU 57 is further connected to an image storage section 61 and an audio processing section 62 via the system bus SB2.

The image storage section 61 stores the image data input by the input/output connector section 41, and reads an arbitrary number of image data as needed.

The audio processing section 62 comprises a sound source circuit such as a PCM sound source. The audio processing section 62 converts audio data provided during projection operation into an analog form, and drives the speaker section 63 to amplify and emit sound, or generates, for example, a "beep" sound, as required.

Next, the operation in the above embodiment is described.

Figure 4:
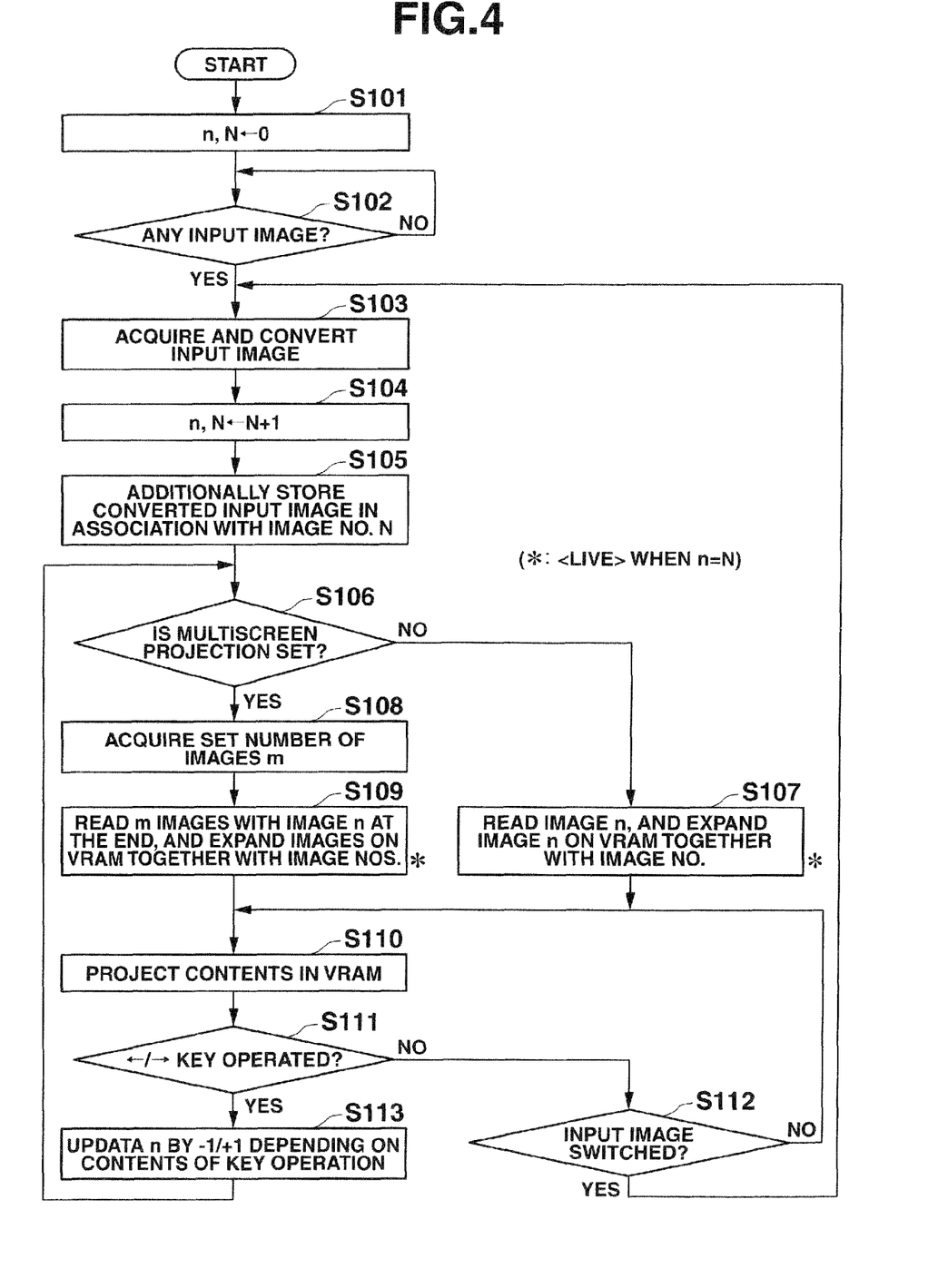
FIG. 4 is a flowchart showing the contents of processing in a multiscreen projection operation according to the embodiment.

FIG. 4 shows the contents of basic processing after the document camera device 1 is connected to the data projector device 2 for performing a projection operation conforming to the image data from the document camera device 1 and power is turned on. In this processing, the operation program read from the program memory 59 is basically expanded on the main memory 58 and executed by the CPU 57.

At the beginning of the operation, two variables n, N are both set to an initial value "0" as an initial setting (step S101). Here, the variable n represents the number of the image currently selected, while the variable N represents the number of images stored in the image storage section 61. Each image is formed by cutting out and extracting the outline of a document picture taken by the document camera device 1.

Then, whether image data is input via the input/output connector section 41 is repetitively judged (step S102), thus waiting for input of image data.

When it is judged that there is an input image, data for this image is acquired via the input/output interface 42, and converted into an image format suitable for projection by the image converting section 43 (step S103).

In addition, the variables n, N are updated and set by a value in which 1 is added to the current variable N (step S104), and converted image data is additionally stored in the image storage section 61 in association with an image number represented by the value of the variable N (step S105).

Then, whether multiscreen projection for projecting a plurality of current image data to fit to one screen is set is judged (step S106).

If the multiscreen projection is not set, image data to which an image number represented by the current variable n is added is read from the image storage section 61, and the read image data is expanded on the VRAM 45, and then the image number is superposed and set as OSD data, in order to perform orthodox projection using one image (step S107).

At this point, if the variable n is equal to variable N, the image data input from the input/output connector section 41 is selected. Thus, an image of, for example, a character string |<Live>| is superposed and projected as OSD data in a part of the image data, for example, at the upper right end in place of the image number set in step S105, such that it is possible to signify that the image is an image currently input from the document camera device 1.

Then, an optical image is formed by the micro mirror element 46 on the basis of the image data expanded in the VRAM 45, and projected by the projection lens unit 52 (step S110).

While this projection operation is being performed, whether to switch the projected image in a front-back direction is determined in accordance with whether either of right and left cursor keys has been operated by the key operation unit 2*c* constituting the operation section 60 or the remote controller (step S111).

If this operation is not performed, whether the image data input from the input/output connector section 41 has been switched to new image data is further judged by comparing the image data input from the input/output connector section 41 with the image data to which the image number N stored in the image storage section 61 is added and thus checking whether they are different (step S112).

When it is judged that the input image data has not been switched, the operation from step S110 is again continuously performed to maintain the projection operation, thus waiting for the execution of an image switching operation or a switch of the input image.

Then, when the image data input from the input/output connector section 41 is switched, a new document is placed as a current projection target on the document table 1a of the document camera device 1. Thus, if it is nudged in step S112 that the input image has been switched, the flow returns to the processing from step S103, and shifts to the operation of projecting the image data input from the input/output connector section 41.

Alternatively, when it is judged in step S111 that any one of the right and left cursor keys has been operated by the key operation unit 2c or the remote controller, such operation has been made to switch the projected image in the front-back direction. Thus, the current value of the variable n is updated and set by adding or subtracting 1 depending on the contents of the key operation (step S113), and then the flow returns to the processing from step S106.

Alternatively, when it is judged in step S106 that the multiscreen projection for projecting a plurality of image data to fit to one screen is set, the number of images m to be simultaneously projected in one screen which is currently set is then acquired (step S108).

Then, m image data with the image number n at the end is read from the image storage section 61 by the variable n showing the number of the image selected at the moment in accordance with the acquired number of images m to generate image data for one image in the image converting section 43. The generated image data is expanded on the VRAM 45, and then the image number for each image is superposed and set as OSD data (step S109).

At this point, if the variable n is equal to variable N, the end image selected at the moment is the image data input from the input/output connector section 41. Thus, an image of, for example, a character string |<Live>| is superposed and projected as OSD data in a part of the image data, for example, at the upper right end in place of the image number set in step S105, such that it is possible to signify that the image is an image currently input from the document camera device 1.

Then, the flow moves to step S110, and an optical image is formed by the micro mirror element 46 on the basis of the image data expanded in the VRAM 45, and projected by the projection lens unit 52.

Figure 5:
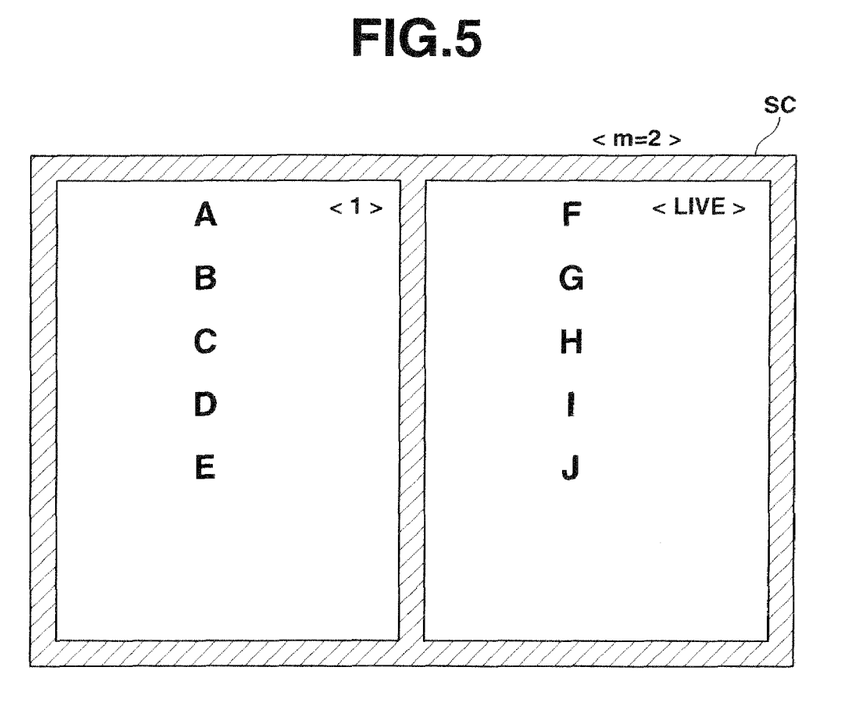
FIG. 5 is a view illustrating a multiscreen projection state according to the embodiment.

FIG. 5 illustrates projected images where the number of images m=2, and the variable n=the variable N=2. In a state shown in FIG. 5, an image of an image number "1" and an image of an image number "2" are composed as one image and projected on a screen SC at the same size.

The image of the image number "2" is an image of a document currently mounted on the document table 1a of the document camera device 1, as described above. An image of the character string |<Live>| is superposed and projected at the end in place of the image number "2" to show that this is the image data input from the input/output connector section 41.

Consequently, while viewing the contents of projection composed of a plurality of images, anyone viewing the projected image on the screen SC can easily understand that the contents of the document currently mounted on the document table 1a of the document camera device 1 correspond to the image to which the character string |<Live>| is added.

Figure 6:
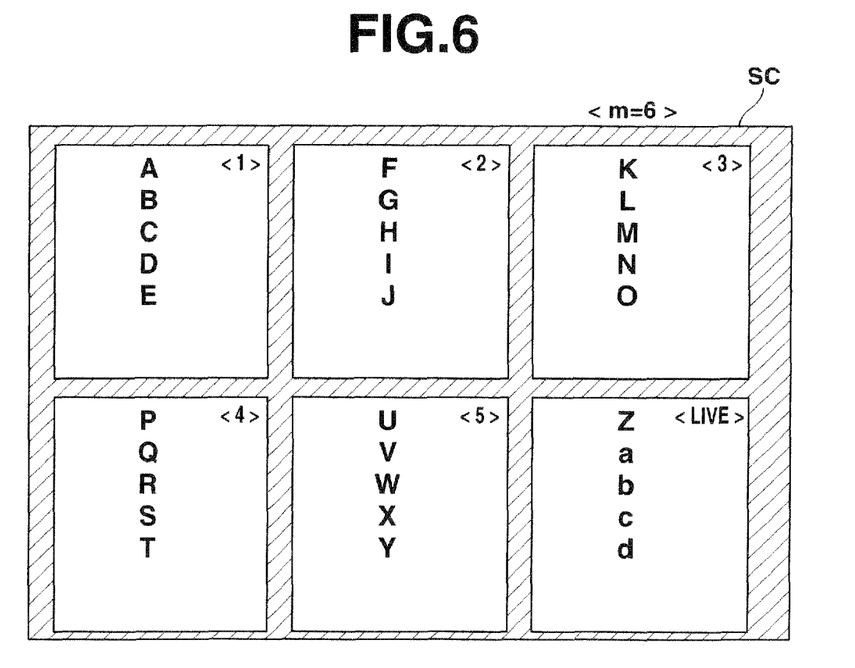
FIG. 6 is a view illustrating a multiscreen projection state according to the embodiment.

FIG. 6 illustrates projected images where the number of images m=6, and the variable n=the variable N=6. In a state shown in FIG. 6, a total of six images of image numbers "1" to "6" are composed into one image with two rows and three columns and projected on the screen SC at the same size.

The image of the image number "6" is an image of a document currently mounted on the document table 1a of the document camera device 1, as described above. An image of the character string |<Live>| is superposed and projected at the end in place of the image number "6" to show that this is the image data input from the input/output connector section 41.

Figure 7:
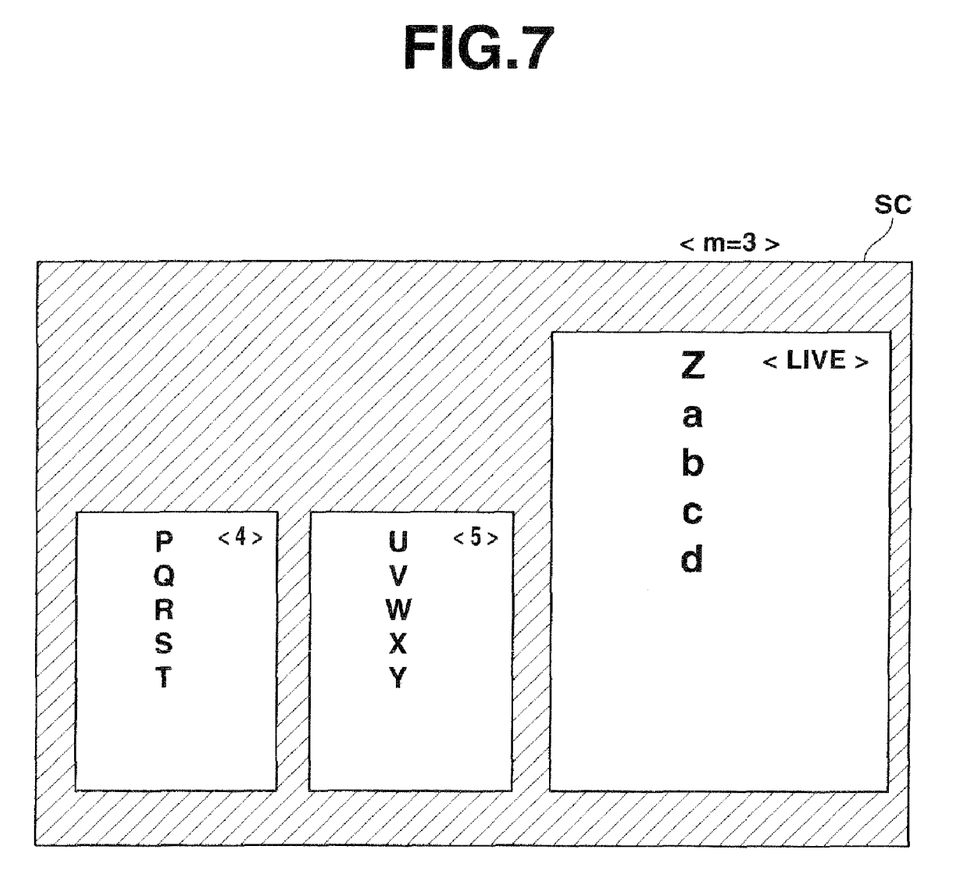
FIG. 7 is a view illustrating a multiscreen projection state according to the embodiment.

Still further, FIG. 7 illustrates projected images in the case of the number of images m=3, and the variable n=the variable N=6. In a state shown in FIG. 7, a total of three images of image numbers "4" to "6" are composed into one image and projected on the screen SC so that only one of them is in a different size.

The image of the image number "6" located at the end is an image of a document currently mounted on the document table 1a of the document camera device 1, as described above. An image of the character string |<Live>| is superposed at the end in place of the image number "6" and projected in a size greater than the other images to show that this is the image data input from the input/output connector section 41.

In this manner, the image located at the end is particularly projected in a greater size in distinction from the other images. Thus, the process up to the moment is shown with a plurality of images so that the contents can be properly recognized as needed. At the same time, the image at the end is projected in a greater size so that the contents of the image located at the end can be presented in a more easily recognizable manner even when the size of the screen SC is limited.

As described above, according to the present embodiment, in multiscreen display in which a plurality of image data are arranged in one image data, identification of the respective image data is achieved in an easily and clearly understandable manner.

Especially, in the embodiment described above, for the image data from the document camera device 1 currently input from the input/output connector section 41, the character string |<Live>|, for example, is distinctively indicated as identification information of a different system in place of a series of numbers stored in the image storage section 61. Thus, the image currently taken by the document camera device 1 can be visually recognized as an image different from previous images.

Furthermore, in the embodiment described above, numbers representing the order of storage in the image storage section 61 are associated as identification information with a series of images, such that the order of input can be known merely by observing the screen, which makes it easy and convenient.

Alternatively, in contrast with the embodiment described above, input image data includes, for example, date/time information such as time stamp information, that is, the external device connected to the data projector device 2 is not the document camera device 1 but a personal computer, a digital camera or a USB memory storing a series of images, and encoded image data such as JPEG image data is input instead of analog-value image signals such as RGB signals. In this case, at least part of the date/time information may be used as identification information, and indicated in association with the respective images in place of the order of storage.

Thus, for example, the date and time at which each image has been taken or generated can be taken over as they are and indicated, and the origin of the image data can be presented.

In addition, while the present invention is applied to an DLP (registered trademark) type data projector device in the embodiment described above, the present invention is also applicable to various other devices, such as a LCD type projector using a transmissive liquid crystal display panel for forming a structure, a rear projection type television device or an overhead projector (OHP), as long as such projector is a projector of a type using an electric-discharge lamp for a light source.

Moreover, the present invention is not limited to the embodiment described above, and various modifications can be made at the stage of carrying out the invention without departing from the spirit thereof. Further, the functions executed in the embodiment described above may be suitably combined together and implemented as needed. The embodiment described above includes inventions at various stages, and suitable combinations of a plurality of disclosed constitutional requirements permit various inventions to be extracted. For example, when the advantages can be obtained even if some of the constitutional requirements shown in the embodiments are eliminated, a configuration in which such constitutional requirements are eliminated can be extracted as an invention. Therefore, the scope of the present invention is solely limited by the following claims.

What is claimed is:

1. A projection device comprising:
   input means for inputting an image signal;
   storage means for storing the image signal input by the input means with identification information attached thereto;
   projection means for forming and projecting an optical image corresponding to the image signal input by the input means; and
   projection control means for controlling the projection means to project a single image corresponding to both an image signal currently input by the input means and at least one image signal already stored in the storage means,
   wherein the single image comprises a plurality of screens respectively corresponding to the currently input and already stored image signals, and each screen includes a display of the identification information of the corresponding currently input and already stored image signals,
   wherein the identification information includes an order number corresponding to an order of input of the inputted image signals, and the storage means stores a total number of the inputted image signals, and
   wherein the display of the identification information of the image signal currently input by the input means is different from the display of the identification information of the image signal already stored in the storage means, and the order number of the image signal currently input by the input means matches the total number of the inputted image signals.

2. The projection device according to claim 1, wherein the input means is a document camera, and each screen of the one image projected by the projection control means corresponds to an extraction and cutout of an outline of a document picture taken by the document camera.

3. The projection device according to claim 1, wherein the identification information includes information representing a date and time, and the display of the identification information on each screen includes at least part of the information representing the date and time.

4. The projection device according to claim 1, wherein the plurality of screens included in the projected single image includes a screen corresponding to the currently input image signal, even when a number of the plurality of screens is fewer than the total number of the inputted image signals.

5. The projection device according to claim 4, wherein the screen corresponding to the currently input image signal is displayed to be largest.

6. A method of projection in a device having a projection section which forms and projects an optical image corresponding to an input image signal that has identification information attached thereto, the method comprising:
   storing the input image signal including the identification information in a memory; and
   controlling the projection section to project a single image corresponding to both a currently input image signal and at least one image signal already stored in the memory
   wherein the single image comprises a plurality of screens respectively corresponding to the currently input and already stored image signals, and each screen includes a display of the identification information of the corresponding currently input and already stored image signals,
   wherein the identification information includes an order number corresponding to an order of input of the inputted image signals, and the memory stores a total number of the inputted image signals, and
   wherein the display of the identification information of the currently input image signal is different from the display of the identification information of the already stored image signal, and the order number of the currently input image signal matches the total number of the inputted image signals.

7. A non-transitory storage medium having stored thereon a program for controlling a device having a projection section which forms and projects an optical image corresponding to an input image signal that has identification information attached thereto, the program controlling the device to execute functions comprising:
   storing the input image signal including the identification information in a memory; and
   controlling the projection section to project a single image corresponding to both a currently input image signal and at least one image signal already stored in the memory,
   wherein the single image comprises a plurality of screens respectively corresponding to the currently input and already stored image signals, and each screen includes a display of the identification information of the corresponding currently input and already stored image signals,
   wherein the identification information includes an order number corresponding to an order of input of the inputted image signals, and the memory stores a total number of the inputted image signals, and
   wherein the display of the identification information of the currently input image signal is different from the display of the identification information of the already stored image signal, and the order number of the currently input image signal matches the total number of the inputted image signals.

* * * * *